May 12, 1953 W. HAUSZ 2,638,556
ACCELERATION SENSING DEVICE
Filed May 8, 1950
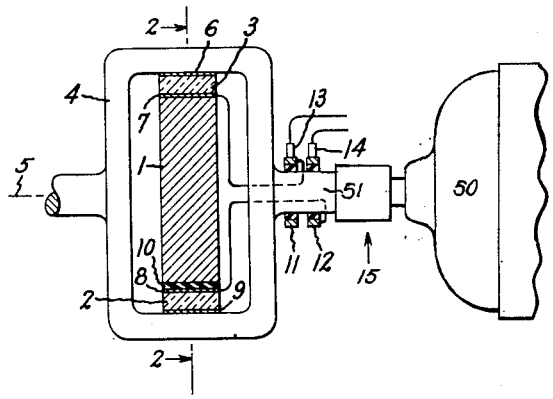
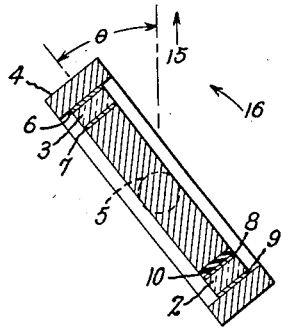
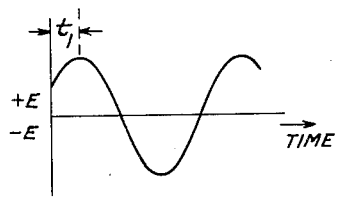
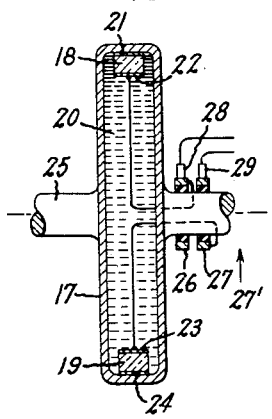
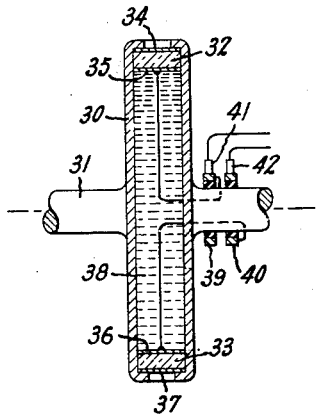
Inventor:
Walter Hausz,
by Paul A. Frank
His Attorney.

Patented May 12, 1953

2,638,556

UNITED STATES PATENT OFFICE 2,638,556

ACCELERATION SENSING DEVICE

Walter Hausz, Syracuse, N. Y., assignor to General Electric Company, a corporation of New York Application May 8, 1950, Serial No. 160,745

3 Claims. (Cl. 310—8.4)

My invention relates to acceleration responsive devices and more particularly to a sensing element for an accelerometer.

In the control of airborne equipment, an accelerometer is required which has a high sensitivity, and it is desirable that this accelerometer does not lose its sensitivity over long periods of time.

Piezoelectric elements, such as quartz crystals or barium titanate ceramics, are often employed as the electro-mechanical transducing elements in such accelerometers. However, if such piezoelectric elements are operated under a constant unidirectional pressure in the manner of conventional piezoelectric crystal accelerometers or used in direct voltage circuits, leakage resistance will, after a time, affect the accuracy of indication of the instrument.

Therefore, I propose a device which has the sensitivity of a piezo-electric crystal accelerometer and yet retains its accuracy throughout extended periods of time. I accomplish this preferably by means of a rigid supporting member, such as a frame work or closed container, in which a pair of piezo-electric crystals are positioned at either end of the supporting member, and a liquid or solid material preferably having a substantial mass is supported within the supporting member so that the material in the supporting member impresses forces on each of the crystals. The supporting member is rotated about an axis through its center and the electrical output of each of these crystals is applied to an amplifier. As the entire supporting member undergoes an acceleration in a linear direction along the line passing through the piezoelectric crystals, there is developed across each crystal an alternating voltage whose amplitude is proportional to the acceleration of the supporting member and whose phase is dependent upon the direction of acceleration. Because of the manner in which I employ the crystals, an alternating voltage is developed, the leakage resistance effect is compensated for, and, consequently, the accuracy of the instrument is not affected by time. Therefore, an object of my invention is to provide a highly sensitive accelerometer which is of a sturdy construction and which may be used without error for long periods of time.

It is a further object of my invention to provide an accelerometer which indicates both the magnitude and the direction of acceleration.

The novel features which I believe to be characteristic of my invention are set forth with particularity in the appended claims. My invention itself, however, both as to its organization and method of operation may best be understood by reference to the following description taken in connection with the figures of the accompanying drawing in which Fig. 1 is a schematic diagram of one embodiment of my invention, Fig. 2 is a diagrammatic cross-sectional view of the device of Fig. 1 taken along line 2—2 of Fig. 1 and illustrated in a typical rotational position relative to a vertical axis, Fig. 3 is a voltage curve illustrating a typical voltage output produced by the device of my invention, Fig. 4 represents another embodiment of my invention, Fig. 5 represents still another embodiment of my invention, and Fig. 6 is an enlarged view of a modified portion of the device of Fig. 5.

Referring to Fig. 1, a rigid bar 1 has at its ends a pair of piezo-electric crystals 2 and 3. These elements are supported within a supporting member such as rigid yoke 4 which puts both crystals under compression between bar 1 and yoke 4. Yoke 4 is rotatable about an axis 5. The surfaces of the crystals 2 and 3 which are adjacent bar 1 and yoke 4 are coated with metallic electrodes 6, 7, 8 and 9 by means well known in the art. A disk 10 mounted between bar 1 and crystal 2 is an insulating layer which is required only if bar 1 is constructed of a conducting material. Electrodes 6 and 9 are electrically connected together by yoke 4 if yoke 4 is constructed of a conducting material. If yoke 4 is not constructed of a conducting material, an additional electrical connection such, for example, as a metallic wire is attached between the electrodes. A pair of slip rings 11 and 12 are mounted on the shaft portion of yoke 4 and are insulated from the shaft. Electrode 7 is electrically connected to slip ring 11 and electrode 8 is electrically connected to slip ring 12. A pair of electrical contact brushes 13 and 14 brush on rings 11 and 12 respectively and carry any voltages there produced into the acceleration measuring circuit to be used. Means, such as motor 50 driving shaft 51, are provided for producing a rotation of the entire assembly within yoke 4 around the axis of rotation 5.

It is a property of a piezo-electric material that when a compressive force is exerted upon two opposite faces such, for example, as those on which electrodes 6 and 7 or 8 and 9 are located, a voltage is produced between the electrodes which is dependent upon the magnitude of the compressive force. If, however, the force is sustained, the voltage will gradually decrease to zero due to leakage current across the crystal and through the external circuit. If the entire device of Fig. 1 be subjected, while not rotating, to acceleration in the direction shown by arrow 15, bar 1 will exert an increased force on crystal 2 and a decreased force on crystal 3. These crystals may be so made that under these conditions the voltages generated by the compressive force and hence by the acceleration make electrode 7 more positive than electrode 6 and electrode 9 more positive than electrode 8. With the connections as shown, brush 13 is thus more positive than brush 14 by the sum of these voltages. However, when the device of Fig. 1 is not rotating these voltages across each of the crystals decrease with time because of the aforesaid leakage currents.

If the direction of acceleration is reversed relative to that direction shown by arrow 15, brush 14 will be more positive than brush 13. If the assembly is rotated about axis 5 while under acceleration in the direction of arrow 15, the acceleration alternately presses bar 1 against crystal 2 and against crystal 3. When bar 1 is pressed against crystal 2 harder than against crystal 3, the voltage between brushes 13 and 14 has one polarity; when pressed against crystal 3 harder than against crystal 2, it has the opposite polarity. As shown in Fig. 3 during one complete revolution about axis 5 the voltage between brushes 13 and 14 varies smoothly through maximum values of each polarity and returns to its original value. By making the speed of rotation rapid compared to the time taken for the voltage to decrease appreciably due to leakage currents, each maximum of voltage is accurately proportional to the acceleration at that time.

With reference to Fig. 2, the device of Fig. 1 is shown as a schematic cross-section perpendicular to the axis of rotation of the device. If from an arbitrary starting position yoke 4 is rotated, its instantaneous angular position is given by angle:

$$\theta = 360 \, wt$$

in which $\theta$ is measured from the reference direction of arrow 15 in degrees, $w$ is the angular velocity in revolutions per second and $t$ is time in seconds.

To each instant of time there corresponds a position measured by $\theta$ as found by the above formula. The voltage across brushes 13 and 14 varies cyclically from its maximum positive value to its maximum negative value and back again. When the device is subjected to an acceleration in an arbitrary direction 16 in the plane of Fig. 2, the magnitude of the acceleration is measured by the peak value of this voltage and the direction can be determined by measuring the time $t$ between the passage of the device through its reference position ($\theta=0$, $t=0$) and the point of maximum positive voltage. The value of $\theta$ corresponding to $t_1$ is $\theta_1 = 360 \, wt_1$.

Referring to Fig. 4, there is shown another embodiment of my invention in which a tube 17 is hermetically sealed at both ends. Piezo-electric crystals 18 and 19 are attached to the two ends of the tube. The tube is filled with a heavy liquid 20 and the crystals have on each of their surfaces an electrode as is the case with the crystals of Fig. 1. Electrodes 21 and 22 are on opposite faces of crystal 18, and electrodes 23 and 24 are on opposite faces of crystal 19. A shaft 25 is mounted in tube 17 such that its axial direction is perpendicular to the longitudinal direction of tube 17 and its longitudinal axis passes through the center of tube 17. A pair of slip rings are mounted on shaft 25, are insulated therefrom, and are electrically connected to electrodes 22 and 23. Slip ring 26 is electrically connected to crystal 18 and slip ring 27 is electrically connected to crystal 19. When the device is not rotating and is accelerated in the direction of the arrow 27', the weight of liquid 20 causes the hydrostatic pressure to be greater against the surfaces of crystal 19 than against crystal 18. This pressure constitutes forces acting against the crystal faces on which electrodes 21, 22, 23 and 24 are located, and, as was described in connection with Fig. 1, this produces voltages between electrodes 21 and 22 and 23 and 24. Crystals 18 and 19 are oriented such that the voltages produced across each of the crystals combines additively between slip ring 26 and slip ring 27. A pair of electrical contact brushes 28 and 29 are connected respectively to slip rings 26 and 27 and the voltage which appears across these brushes is supplied to an acceleration measuring circuit used in connection with this device.

It should be noted that the hydrostatic pressure also creates forces against the faces of both crystals other than those on which the electrodes are placed. There are some crystalline substances such, for example, as tourmaline and lithium sulphate and home ceramics such, for example, as barium titanate that will produce a voltage proportional to the applied hydrostatic pressure, but not all the materials suitable for crystals in Fig. 1 are suitable in this configuration. The voltages caused across the crystals in this configuration will decrease due to leakage as described for the configuration of Fig. 1 but as previously described, rotation of the device about shaft 25 will make the voltage between brushes 28 and 29 vary cyclically and permit accurate measurement of the magnitude and direction of the acceleration. The schematic representation of another configuration is shown in Fig. 5 in which a hermetically sealed tube 30 is mounted on a shaft 31. The axis of shaft 31 is through the center of tube 30. A pair of crystals 32 and 33, which in this configuration comprise the ends of the tube, have mounted on opposite faces of them electrodes. Electrodes 34 and 35 are mounted on opposite faces of crystal 32 and electrodes 36 and 37 are mounted on opposite faces of crystal 33. Tube 30 contains a heavy liquid 38 such that electrode 35 and electrode 36 are exposed to this liquid and the other side of crystals 32 and 33 are exposed to the atmosphere or any other medium in which the device may be located. A pair of slip rings 39 and 40 are mounted on shaft 31 and are insulated therefrom, and a pair of electrical brushes 41 and 42 brush against these slip rings. The hydrostatic pressure due to the effect of acceleration on the liquid causes an increase in the force on electrode 36 and a decrease in the force on electrode 7. The detailed drawing of Fig. 6 shows one method by which a crystal can be used to close off the end of a tube such that the liquid exerts a uniform pressure against the electrode which is mounted on the inner surface of the crystal. Because the pressure on the inner surface of crystal 33 is uniform, the total force exerted on the crystal is equal to the product of the pressure and the area of the crystal face exposed to the liquid. Because the pressure in the external medium is quite different and usually less than the pressure within tube 30, there is no uniform force equally distributed over electrode 37 as in the previous configurations discussed. Instead, the crystal is supported by its edges in a manner such as to produce a liquid-tight seal and the total force around this narrow edge must equal the total force applied to crystal 36 when the system is in equilibrium. If this force were not equal, the crystal would be driven from the tube. It can be seen that this distribution of forces tends to bend the crystal as indicated by dotted line 43 as well as compress the crystal. Because there are ceramic and crystalline substances well known in the art which will produce a much higher voltage between electrodes when subjected to bending forces than when subjected to compressive forces, this particular modification shown in Fig. 5 can produce more voltage for a given acceleration than the other forms, other things such as length of tube and density of liquid being equal. On the other hand, since crystals may be more easily broken in bending than in compression, the maximum acceleration and the maximum rate of rotation are limited in this design.

It should be noted that in all of these variations of my invention the speed of rotation can cause a centrifugal force which presses against one or both crystals producing a continuous voltage that does not vary cyclically. If the speed of rotation is kept reasonably constant, however, this voltage will decrease to zero due to leakage currents leaving only the cyclical variation due to linear acceleration of the device as a whole. In any case, the external amplifier circuit may be made, by means well known in the art, to be sensitive only to the variations of voltage of the same frequency as that corresponding to the rate of rotation.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. An accelerometer comprising a plurality of piezo-electric crystals cut to produce a voltage between opposite faces thereof in response to a compressive force between said opposite faces of each of said crystals, a rigid bar interposed between said crystals and in juxtaposition to one of said faces of each of said crystals, said crystals being provided with a metallic electrode on each of said faces, insulation disposed between said bar and an adjacent face of one of said crystals, a framework to the inner sides of which one of said faces of each of said crystals is fastened, electrical connections between each of said faces which are adjacent said bar, and means for rotating said framework about an axis perpendicular to the longitudinal axis of said bar and passing through the center thereof, whereby an alternating voltage is developed between said electrical connections which has an amplitude and a phase angle with respect to said framework dependent upon the magnitude and direction of the acceleration of said framework.

2. An acceleration responsive device comprising a supporting member having an axis of rotation, at least one pair of piezoelectric elements supported by said supporting member on diametrically opposite sides of said axis of rotation, each piezoelectric element having electrical connections to opposite faces thereof and generating a voltage between said electric connections in response to a compressive force applied to said element, a material supported within said supporting member in pressure exerting contact with both said elements whereby said material exerts increased compressive force on one of said elements and decreased compressive force on the other of said elements upon an acceleration of said supporting member along a line connecting said elements, and means for rotating said supporting member about said axis whereby each element generates an alternating voltage having an amplitude responsive to the magnitude of said acceleration.

3. An acceleration sensing device comprising an elongated closed container, at least two piezoelectric elements secured to and within opposite ends of said container, electrical connections to opposite faces of each element, a liquid filling said container, and means for rotating said container about an axis of rotation perpendicular to the center of the longitudinal axis of said container.

WALTER HAUSZ.

References Cited in the file of this patent
UNITED STATES PATENTS

| Number | Name | Date |
| --- | --- | --- |
| 1,930,905 | Nicolson | Oct. 17, 1933 |
| 2,342,869 | Kinsley | Feb. 29, 1944 |
| 2,371,626 | Kecskemeti | Mar. 20, 1945 |
| 2,490,452 | Mason | Dec. 6, 1949 |
| 2,514,297 | Smith | July 4, 1950 |